(12) United States Patent
Harms et al.

(10) Patent No.: US 9,266,135 B2
(45) Date of Patent: Feb. 23, 2016

(54) DISPENSER FOR THE DOSED DISPENSING OF LIQUID MEDIA

(75) Inventors: Heiko Harms, Menden (DE); Gisbert Welp, Sundern (DE)

(73) Assignee: MeadWestvaco Calmar GmbH, Norcross, GA (US)

( * ) Notice: Subject to any disclaimer, the term of this patent is extended or adjusted under 35 U.S.C. 154(b) by 0 days.

(21) Appl. No.: 14/115,946

(22) PCT Filed: May 16, 2012

(86) PCT No.: PCT/EP2012/002146
§ 371 (c)(1),
(2), (4) Date: Nov. 6, 2013

(87) PCT Pub. No.: WO2012/156098
PCT Pub. Date: Nov. 22, 2012

(65) Prior Publication Data
US 2014/0069961 A1    Mar. 13, 2014

(30) Foreign Application Priority Data

May 18, 2011    (DE) .......................... 10 2011 106 261

(51) Int. Cl.
*G01F 11/00*        (2006.01)
*B05B 11/00*       (2006.01)
(Continued)

(52) U.S. Cl.
CPC ......... *B05B 11/3025* (2013.01); *B05B 11/0059* (2013.01); *B05B 11/3004* (2013.01); *B05B 11/307* (2013.01); *G01F 11/025* (2013.01); *G01F 11/265* (2013.01)

(58) Field of Classification Search
CPC ............ B05B 11/3025; B05B 11/3004; B05B 11/0059; B05B 11/307; G01F 11/025; G01F 11/265
USPC .................................... 222/376, 321.6, 321.7
See application file for complete search history.

(56) References Cited

U.S. PATENT DOCUMENTS 4,726,747 A * 2/1988 Skorka .......................... 417/489
5,577,640 A * 11/1996 Albini et al. .................. 222/378
(Continued)

FOREIGN PATENT DOCUMENTS

DE        3014267 A1    10/1981
DE        10050081 C1   10/2002
(Continued)

OTHER PUBLICATIONS

International Preliminary Report on Patentability for PCT/EP2012/002146 mailed on Sep. 26, 2012, 6 pages.
(Continued)

*Primary Examiner* — Patrick M Buechner
*Assistant Examiner* — Jeremy W Carroll
(74) *Attorney, Agent, or Firm* — WestRock Intellectual Property Group

(57) ABSTRACT

Dispenser (1) for the dosed dispensing of liquid media, with a container (3) for holding a liquid medium (4), a manually actuated pump (5), which is arranged on the container (3) and comprises a flood chamber (6) into which liquid medium (4) flows when the container (3) is turned over, for which purpose the flood chamber (6) is fluidically connected at the inlet end to an outlet opening (7) of the container (3), and a dosing piston (8), which is displaceable by an actuating stroke, is arranged in the flood chamber (6) and expels dosed medium (4), and a media channel (9) extending through the dosing piston (8) is widened at the inlet end as a volumetrically defined cylinder portion (10) into which a plunger piston (11) protruding into the flood chamber (6) engages as a pressure piston in order to expel medium (4) introduced by gravity into the cylinder portion (10) of the dosing piston (8).

9 Claims, 3 Drawing Sheets

(51) Int. Cl.
*G01F 11/02* (2006.01)
*G01F 11/26* (2006.01)

(56) References Cited

U.S. PATENT DOCUMENTS

| | | | |
|---|---|---|---|
| 8,292,131 B2 * | 10/2012 | Pruvot | 222/321.6 |
| 2008/0000933 A1 * | 1/2008 | Marelli | 222/321.7 |
| 2008/0073380 A1 * | 3/2008 | Pennaneac'h | 222/321.2 |
| 2010/0163582 A1 | 7/2010 | Collins | |
| 2011/0278328 A1 * | 11/2011 | Kang | 222/340 |

FOREIGN PATENT DOCUMENTS

| | | |
|---|---|---|
| DE | 10058081 C1 | 10/2002 |
| DE | 10231749 A1 | 2/2004 |
| WO | WO2009/149825 A1 | 12/2009 |

OTHER PUBLICATIONS

International Search Report of PCT/EP2012/002146 mailed on Sep. 26, 2012, 2 pages.
Translation of Office Action corresponding to CN 201280035937.1, Jun. 22, 2015, 7 pages.

* cited by examiner

DISPENSER FOR THE DOSED DISPENSING OF LIQUID MEDIA

The invention relates to a dispenser for the dosed dispensing of liquid media in accordance with the preamble of claim 1.

DE 30 14 267 A1 discloses a device for the dosed dispensing of liquid content from containers. Volumetric devices for the dispensing of metered quantities of liquid content are known, for example, in the form of so-called drop dispensers, which have gained widespread use in the medical sector and also in the cosmetics sectors. The dispensing is achieved by tilting the container. For exact dosing and ease of use, provision is made that, when the container is tilted, the content always passes first into a flood chamber mounted upstream of the dispensing area.

The operator frees the content from there via a slide-operated dosing piston, such that the dispensing is no longer influenced in an uncontrolled manner by the pressure of a residual filling, as is the case in squeeze bottles. The dosing piston has piston discs arranged at an axial distance from each other, which distance corresponds to the length of the flood chamber. In the closed position, the container-side piston disc lies at a distance from the container-side flood chamber opening. The flood chamber itself can then, as volumetric discharge device, release fairly large metered and always constant quantities. With the corresponding advance of the slide, the container-side piston disc has the effect that the portion to be dispensed is separated from the residual content. The output-side piston disc is just in front of the output-side flood chamber opening. A further shift allows the dosed quantity to then emerge. In a structurally advantageous embodiment, the flood chamber is formed by a cylindrical shaft, through the lid of which the piston rod is guided. Conditions that favour operation are obtained when the slide for moving the dosing piston has a slide key. This permits convenient operation with one hand.

A disadvantage is that, when the dispenser is turned upside down and the force of gravity used, the dosage accuracy is not good enough.

The object of the invention is therefore to make available a dispenser with a dosing chamber which can be filled by gravity and which permits improved dosing accuracy and ease of handling.

This object is achieved by the features of claim 1.

In this way, a dispenser is created which, compared to simple squeeze bottles, has the important advantage that an exact quantity is discharged by virtue of a dimensional construction of the filling volume of a dosing chamber together with the stroke movement. By arranging a dosing chamber in the dosing piston in the form of a volumetrically defined cylinder portion of the latter, a position of the dosing chamber in the flood chamber is achieved which allows the dispenser not only to discharge medium when upside down but also to discharge medium within a much greater angle range and thus empty the container almost completely.

By omitting suction components, the dispenser can work with considerably fewer parts and can thus be produced inexpensively. The discharged dose can be in the form of a droplet or a gentle spray.

Depending on the microbiological requirements, the system can be designed with or without a nozzle closure. The discharge end of the dosing chamber is also preferably assigned an automatically closing valve. In this way, a return flow into the dosing chamber is avoided.

It is also preferable that the flood chamber has a lid-like container cover, which has individual discrete let through-openings for passage of medium from the container into the flood chamber. This ensures that medium that has flown into the flow chamber does not flow back into the container, which can likewise prove advantageous on the extended angle range of the use of the dispenser.

Further embodiments and advantages of the invention will become clear from the following description and from the dependent claims.

The invention is explained in more detail below on the basis of the illustrative embodiment of a dispenser shown in the attached figures.

Figure 1:
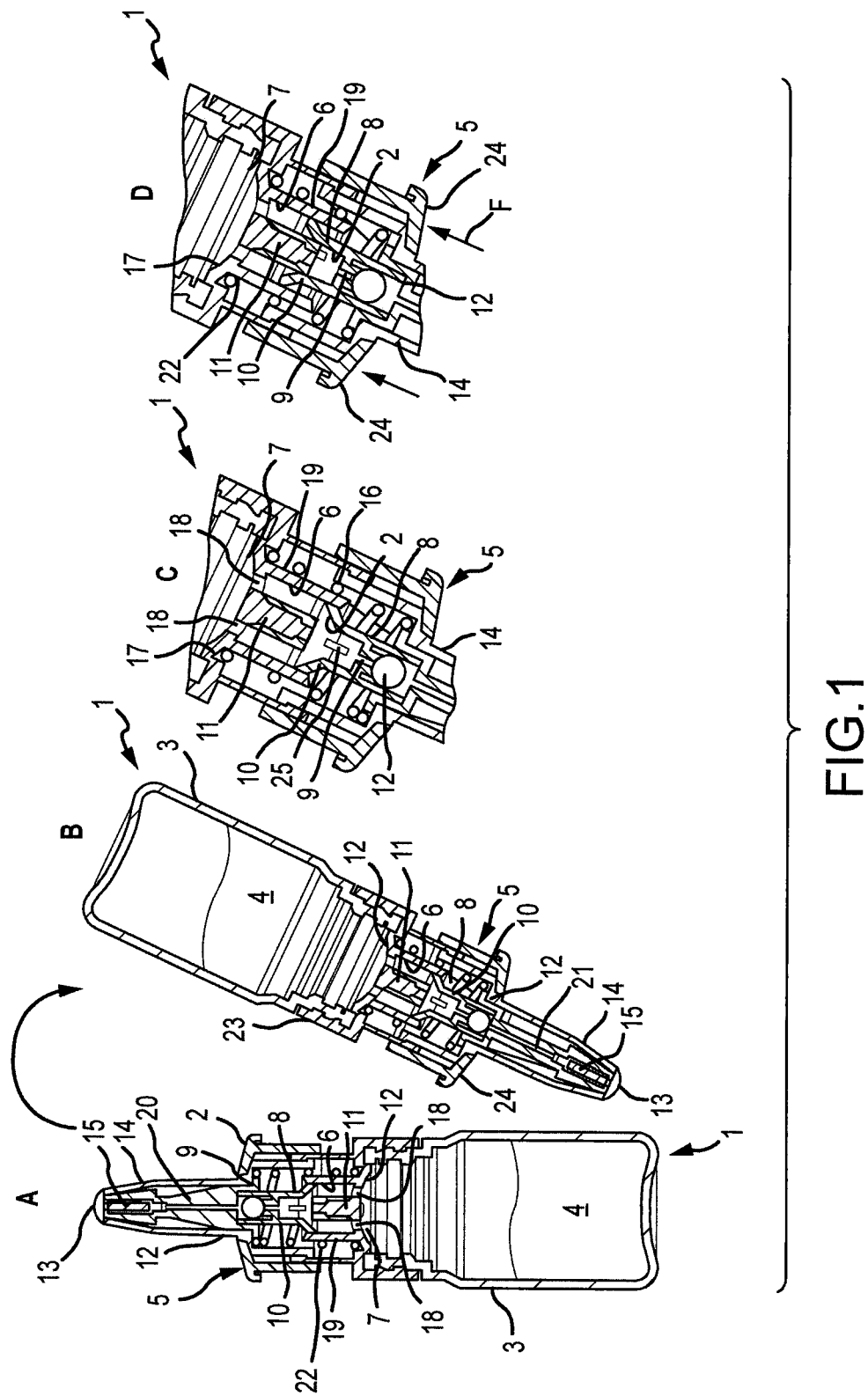
FIG. 1 shows longitudinal sections or partial longitudinal sections through a dispenser in a function sequence A, B, C, D.
Figure 2:
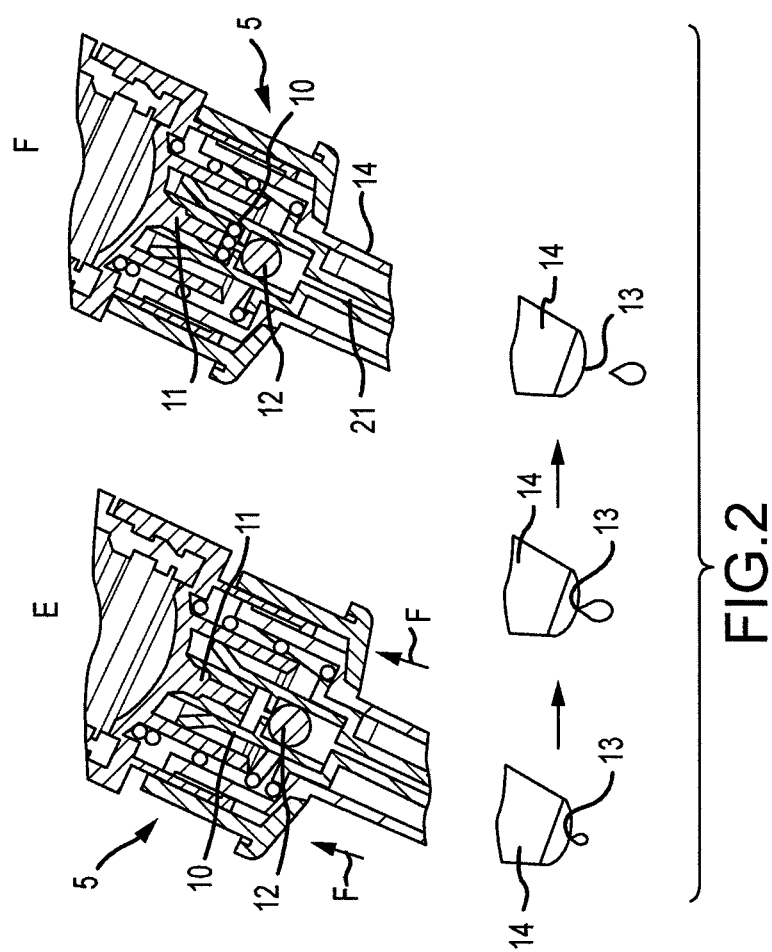
FIG. 2 shows partial longitudinal sections through the dispenser from FIG. 1 in a function sequence E, F.
Figure 3:
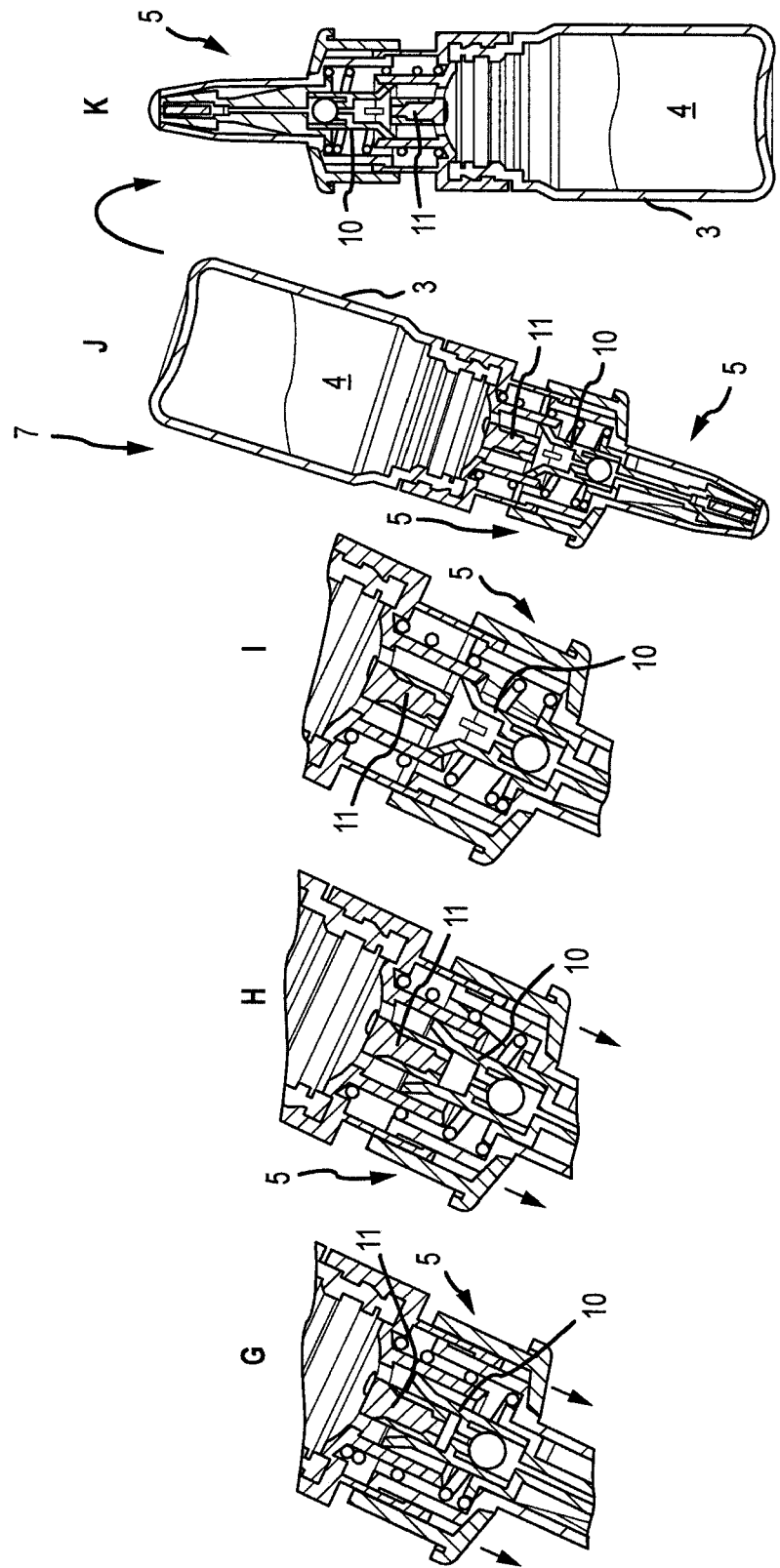
FIG. 3 shows longitudinal sections or partial longitudinal sections through the dispenser from FIG. 1 in a function sequence G to K.

FIGS. 1 to 3 show a dispenser 1 with a dosing chamber 2 that can be filled by gravity and that is used for the dosed dispensing of liquid media. The dispenser 1 comprises a container 3 for holding a liquid medium 4. A manually actuated pump 5 is arranged on the container 3.

The manually actuated pump 5 comprises a flood chamber 6 into which liquid medium 4 flows when the container 3 is turned over, for which purpose the flood chamber 6 is fluidically connected at the inlet end to an outlet opening 7 of the container 3.

A dosing piston 8, which is displaceable by an actuating stroke F, is arranged in the flood chamber 6 and expels dosed medium. A media channel 9 extends through the dosing piston 8 and is widened at the inlet end as a volumetrically defined cylinder portion 10. A plunger piston 11 protruding into the flood chamber 6 engages in the cylinder portion 10 as a pressure piston, in order to expel medium introduced by gravity into the cylinder portion 10 of the dosing piston 8.

A self-acting outlet valve 12 is assigned to the discharge end of the flood chamber 6 and is fluidically connected to a discharge head 14, which has a discharge opening 13. The discharge head 14 preferably receives an automatically closing, spring-loaded valve body 15. A discharge head that can be used is described, for example, in WO 2009/149825 A1.

The dosing piston 8, at the end thereof directed towards the plunger piston 11, preferably has a widened inlet socket 16. The volumetrically defined cylinder portion 10 preferably forms a partial portion of a pot-shaped dosing piston 8. The volumetrically defined cylinder portion 10 forms a dosing chamber in the dosing piston 8.

The plunger piston 11 protrudes in a preferably fixed position from a lid-like container cover 17. The container cover 17 has individual let through-openings 18 for allowing medium 4 from the container 3 to enter the flood chamber 6 by gravity when the container 3 is turned over. The container cover 17 forms a bottom of the flood chamber 6 provided with let through-openings 18. Moreover, the container cover 17 preferably has a sleeve-like continuation 19 as an edge boundary of the flood chamber 6. The dosing piston 8 is guided sealingly on the inside wall of this continuation 19. The sleeve-like continuation 19 is preferably arranged coaxially with respect to the plunger piston 11.

The dosing piston 8 is secured on the discharge head 14. For this purpose, the discharge head 14 has, for example, an inner sleeve 20 through which a media channel 21 is guided that is fluidically connected to the cylinder portion 10 in the dosing piston 8 and to the discharge opening 13. Counter to the action of a compression spring 22, the discharge head 14 can be moved together with the dosing piston 8 towards the plunger piston 11, i.e. the dosing piston 8 executes a relative movement with respect to a pump base part 23 formed in a fixed position on the container 3. The pump 5 is arranged on the container 3 via the pump base part 23. The compression spring 22 is supported between this pump base part 23 and the discharge head 14, which are displaceable relative to each other in order to permit a pump stroke, as is shown by the force arrow F in view D in FIG. 1. For its actuation, the discharge head 14 can have at least one actuating surface 24.

The way in which the dispenser 1 functions is described below on the basis of views A to K in FIGS. 1 to 3:

View A shows the dispenser 1 in half section in the storage or rest position. The cylinder portion 10 forming the dosing chamber in the dosing piston 8 is emptied by gravity. Medium that has entered the flood chamber 6 flows back through the let through-openings 18 into the container 3.

View B shows the dispenser 1 in a use position. By being turned from the rest position to the use position, the flood chamber 6 and the cylinder portion 10 are flooded by gravity with the medium. The use position can be an upside-down position or an angled position, as is shown in view B. The dispenser 1 can be reliably actuated at angles deviating by up to 45° from the vertical.

View C shows that the cylinder portion 10 is open towards the top. The valve 12 below the cylinder portion 10 closes the dispenser 1 towards the bottom, i.e. no medium escapes through the discharge opening 13.

As is shown in view D, the discharge head 14 is moved along the axis of symmetry in the direction of the plunger piston 11 by means of pressure being applied to the actuating surfaces 24 (arrows indicated by F). When the plunger piston 11 and the dosing piston 8 with the cylinder portion 10 meet each other, the compression procedure is initiated. However, by means of dosing slits 25, which can be provided in the wall of the cylinder portion 10, the chamber thus formed is not yet tightly closed. Medium is forced back into the flood chamber 6 and the container 3.

FIG. 2 shows, with views E and F, the discharge of a quantity of medium, here a droplet.

View E shows that, at the end of the dosing slits 25, the plunger piston 11 is sealed in the cylinder portion 10 of the dosing piston 8, i.e. a volumetric quantity of medium is then separated from the flood chamber 6. A further movement in force direction F leads to a pressure increase within the cylinder portion 10 of the dosing piston 8. On account of the pressure increase, the valve 12 opens, such that medium is displaced through the valve 12 and through the media channel 21 in the direction of the discharge opening 13. The displaced medium begins the droplet formation at the discharge opening 13.

View F shows that, at the end of the actuation path, the valve 12 closes again, since no more medium is delivered. The droplet formed at the discharge opening 13 tears off and falls by gravity in the direction of the intended site of application, for example the eye.

FIG. 3 shows, with views G to K, the resetting of the dispenser 1 to its starting position.

View G illustrates that, when the force on the actuating surfaces 24 decreases, the discharge head 14 moves back again to its starting position, and an under pressure develops within the cylinder portion 10 of the dosing piston 8.

View H illustrates that, as soon as the dosing slits 25 are covered again in the opposite direction by the plunger piston 11, the under pressure within the cylinder portion 10 ensures an abrupt refilling of the cylinder portion 10 in the dosing piston 8. If no dosing slits 25 are provided, this is the case when the plunger piston 11 disengages from the dosing piston 8.

View I shows the pump 5, which has reached its starting position again and is ready to dispense the next droplet. The next discharge of medium begins again when an actuating force F is applied, as shown in view D.

View J shows the dispenser in the use position. By turning the dispenser over from the use position to the rest position, the flood chamber 6 and dosing piston 8 are emptied by gravity.

View K shows the dispenser 1 in half section in the storage or rest position.

The invention claimed is:

1. Dispenser for the dosed dispensing of liquid media, comprising a container for holding a liquid medium, a manually actuated pump, which is arranged on the container and comprises a flood chamber into which liquid medium flows when the container is turned over, for which purpose the flood chamber is fluidically connected at the inlet end to an outlet opening of the container, and a dosing piston, which is displaceable by an actuating stroke, is arranged in the flood chamber and expels dosed medium, wherein a media channel extending through the dosing piston is widened at the inlet end as a volumetrically defined cylinder portion into which a plunger piston protruding into the flood chamber engages to exert a pressure in order to expel medium introduced by gravity into the cylinder portion of the dosing piston, and wherein dosing slits are provided in a wall of the cylinder portion through which liquid medium is forced back into the flood chamber and the container by operation of the plunger piston.

2. Dispenser according to claim 1, wherein an automatic outlet valve is assigned to the discharge end of the flood chamber and is fluidically connected to a discharge head, which has a discharge opening.

3. Dispenser according to claim 2, wherein the discharge head receives an automatically closing, spring-loaded valve body.

4. Dispenser according to claim 1, wherein the dosing piston, at the end thereof directed towards the plunger piston, has a widened inlet socket.

5. Dispenser according to claim 1, wherein the volumetrically defined cylinder portion forms a partial portion of a pot-shaped dosing piston.

6. Dispenser according to claim 1, wherein the plunger piston protrudes in a fixed position from a container cover, which has individual let through-openings for allowing medium from the container to enter the flood chamber by gravity when the container is turned over.

7. Dispenser according to claim 6, wherein the container cover forms a bottom of the flood chamber provided with let through-openings.

8. Dispenser according to claim 6, wherein the container cover has a continuation shaped as a sleeve as an edge boundary of the flood chamber, on which the dosing piston is guided in a sealed manner.

9. Dispenser according to claim 8, wherein the sleeve-like continuation is arranged coaxially with respect to the plunger piston.

* * * * *